(12) United States Patent
Guetta et al.

(10) Patent No.: US 11,104,434 B2
(45) Date of Patent: Aug. 31, 2021

(54) ROAMING AIRBORNE EXPLORER SYSTEM

(71) Applicant: SHILAT OPTRONICS LTD, Rehovot (IL)

(72) Inventors: Avishay Guetta, Rehovot (IL); Dekel Solomon, Tel-Aviv (IL); Hezi Shalom, Shaalvim (IL)

(73) Assignee: SHILAT OPTRONICS LTD., Rehovot (IL)

( * ) Notice: Subject to any disclaimer, the term of this patent is extended or adjusted under 35 U.S.C. 154(b) by 272 days.

(21) Appl. No.: 16/083,509

(22) PCT Filed: Mar. 9, 2017

(86) PCT No.: PCT/IL2017/050311
§ 371 (c)(1),
(2) Date: Sep. 9, 2018

(87) PCT Pub. No.: WO2017/154010
PCT Pub. Date: Sep. 14, 2017

(65) Prior Publication Data
US 2019/0084672 A1 Mar. 21, 2019

Related U.S. Application Data

(60) Provisional application No. 62/389,809, filed on Mar. 10, 2016.

(51) Int. Cl.
*B64C 39/02* (2006.01)
*B64B 1/30* (2006.01)
(Continued)

(52) U.S. Cl.
CPC .............. *B64C 39/024* (2013.01); *B64B 1/30* (2013.01); *B64B 1/40* (2013.01); *B64D 47/08* (2013.01);
(Continued)

(58) Field of Classification Search
CPC ............ B64C 39/024; B64C 2201/101; B64C 2201/108; B64C 2201/123; B64B 1/30; B64B 1/40; B64D 47/08
See application file for complete search history.

(56) References Cited

U.S. PATENT DOCUMENTS 2,347,163 A 4/1944 Kraft
4,799,914 A * 1/1989 Hutchinson ............ A63H 27/10
244/30
(Continued)

FOREIGN PATENT DOCUMENTS

KR 101379197 A 3/2014
TW 201512039 A 4/2015
(Continued)

*Primary Examiner* — Rodney A Bonnette
(74) *Attorney, Agent, or Firm* — Alphapatent Associates, Ltd.; Daniel J. Swirsky

(57) ABSTRACT

An airborne device for surveillance of an enclosed area, comprising a platform having illuminating imaging devices, and an attached lighter than air balloon. A vertically aligned rotor provides additional lift, a rotor directed along the length of the platform provides forward and backward motion, and additional rotors aligned sideways steer and rotate the device. The rotors are driven by electric motors powered by an on-board battery. A vertically directed distance sensor measures and controls the hovering distance of the device from the roof. A reel of optical fiber is installed at the rear end of the platform, and the optical fiber unwinds from the reel and deploys behind the device as it moves forward. This optical fiber carries image data back to a monitor. The length of fiber deployed, combined with directional and accelerometer readings can be used to determine the absolute position of the device.

12 Claims, 3 Drawing Sheets

(51) Int. Cl.
*B64B 1/40* (2006.01)
*B64D 47/08* (2006.01)

(52) U.S. Cl.
CPC .. *B64C 2201/101* (2013.01); *B64C 2201/108* (2013.01); *B64C 2201/123* (2013.01)

(56) References Cited

U.S. PATENT DOCUMENTS

| | | | | |
|---|---|---|---|---|
| 5,520,346 | A * | 5/1996 | Hoban | B65H 49/34 242/128 |
| 7,080,825 | B1 * | 7/2006 | George | B66D 3/18 254/267 |
| 2011/0180667 | A1 * | 7/2011 | O'Brien | B64C 39/024 244/135 R |
| 2012/0273608 | A1 * | 11/2012 | Jess | B64B 1/08 244/26 |
| 2015/0298786 | A1 * | 10/2015 | Stigler | B64B 1/36 244/30 |
| 2019/0152577 | A1 * | 5/2019 | Kim | B64B 1/58 |

FOREIGN PATENT DOCUMENTS

| | | | |
|---|---|---|---|
| WO | 03018400 | A | 3/2003 |
| WO | 2011005851 | A | 1/2011 |

\* cited by examiner

ROAMING AIRBORNE EXPLORER SYSTEM

CROSS-REFERENCE TO RELATED APPLICATIONS

This application is a U.S. National Phase Application under 35 U.S.C. 371 of International Application No. PCT/IL2017/050311, which has an international filing date of Mar. 9, 2017, and which claims the benefit of priority from U.S. Provisional Patent Application No. 62/389,809, filed Mar. 10, 2016, the disclosures of which are incorporated herein by reference in their entirety.

FIELD OF THE INVENTION

The present invention relates to the field of the exploration and charting of unknown covered sites, especially in unfavorable situations, such as in darkness or in the presence of smoke, especially in underground or roofed-in locations.

BACKGROUND

There are many situations when it is desirable to explore an unknown or uncharted site, particularly covered locations, which may be unamicable to humans, and which may have a problematic environmental situation. Such situations can include the need for firefighters to enter smoke-filled buildings, which could include a maze of corridors and rooms having unknown locations, or the need to explore underground mine passages after an explosion, in which poisonous gases may be present, or the need to check underground sewage pipes or tunnels, or floodwater culverts for damage, or for unauthorized access points. The latter situation has become of importance in checking cross-border underground water passages, which have been used to enable the smuggling of goods or persons, by excavating unauthorized added shafts from the main tunnel, the exits of these added shafts being planned in open locations, unguarded by law enforcement authorities. It is understood that such unauthorized movement of persons and drugs has occurred at certain borders of the USA. Currently, such reconnaissance tasks are typically undertaken using an autonomous roaming exploration device, in the form of a robotic cart equipped with an infrared camera, which sends imaged information to the monitoring station, often through a fiber-optic or electrical cable attached at one end to the cart and at the other end to the monitoring station. However, such a cart device has a number of disadvantages. Firstly, the terrain or surface along which it is moving may be damaged or rugged, such as after an explosion in a mine, making the location difficult for access by a wheeled or even a tracked cart. Secondly, the power and data cable may become snagged or stuck on an impediment encountered, thereby being parted and losing its ability to transmit image data. Thirdly, an underground location of the exploratory cart may make it impossible to use GPS systems for defining its position.

There therefore exists a need for an autonomous roaming exploration device, which overcomes at least some of the disadvantages of prior art systems and methods.

The disclosures of each of the publications mentioned in this section and in other sections of the specification, are hereby incorporated by reference, each in its entirety.

SUMMARY

The present disclosure describes a new exemplary system incorporating an airborne roaming device for progressing along an uncharted or unknown internal passageway or through a covered area, often under conditions of limited visibility, in order to map the content of the passageway or the area. Typical environments in which such a system can be used have been described in the background section of this disclosure. The system comprises three primary elements:

(i) The roaming device itself, which can travel down the passageway to be explored. The device comprise a payload platform incorporating an imaging camera, with a lighter than air balloon providing the major contribution to the buoyancy of the platform, in conjunction with a number of rotors which together provide additional lift, and directional motion and orientation of the device.

(ii) A control module, located at a position outside of the passageway, such that the operator is not exposed to the potentially problematic environmental conditions within the passageway; and (iii) A control line connecting the roaming device with the control module, primarily to transfer images or other sensor outputs from the roaming device back to the control module, but also able to convey control commands from the control module to the roaming device. The control line is preferably implemented by means of a fiber optical link, in which the optical fiber is paid out from a reel carried on the roaming device.

The payload platform has some resemblance to a quadcopter drone device, in that some lift is provided by a rotor having vertically disposed rotation axes, the rotor being driven by means of an electric motor powered from an onboard battery source. However unlike conventional quadcopter devices, in the current devices, the majority of the lifting power of the device is provided by a lighter than air balloon, from which the payload platform is supported. In optimal configurations, the balloon is made to be of such a volume and has a gas fill such that it can provide typically over 90% of the buoyancy required to maintain the payload platform airborne. This has the immediate effect of providing a substantially longer flight time than a conventional quadcopter device, since the battery has to supply power for only a fraction of the lift required, while in a quadcopter device, the battery has to provide for 100% of the lifting power of the device, besides the horizontal motion drive. Furthermore, the additional buoyancy and stability provided by the balloon, means that a single lift rotor can be used, instead of the four rotors used in quadcopters, though the use of more than one rotor in the presently described device is not precluded. Additionally, the use of a balloon supporting the payload platform from above, increases the control stability of the platform.

Once the rotor configuration has been relieved of its main requirement to provide buoyancy, the rotor or rotors of the presently described devices can be made substantially smaller than rotors of a similar sized quadcopter, but they are then less efficient at providing longitudinal (forward and backward) motion and pitch and yaw motions. However, additional rotors added to the payload platform can perform these motions, generally with greater efficiency and ease of control and stability than that of a conventional quadcopter aircraft. The number of rotors used can be between four and six, and this combination should enable the device:

(i) to hover in space at a fixed height from the ceiling or floor, (ii) to move laterally in all four directions (forwards, backwards, to the right and to the left), (iii) to rotate on its own axis (the yaw axis) while spatially stationary, (iv) to adjust the pitch angle of the payload platform, and (v) to adjust the roll angle of the payload platform.

The combination of rotors should be such as to provide the payload platform with controlled motion with at least 5 directions of freedom.

A forward-looking camera is installed in the nose section of the payload platform, in order to provide a real time video in the direction in which the payload platform is moving. A light source is also provided for situations—which are expected to be most situations—where there is no or little ambient illumination. The use of Light Emitting Diode (LED) sources is generally advantageous and convenient. The sources may be chosen to emit in the visible or in the infrared. The use of forward looking infrared (FLIR) imaging enables the imaging system to penetrate smoke and fumes, such as may be present in an environment in which the device is being used. The camera may be gimbal-mounted or pivot mounted, and electronically controlled to image different sectors in the path of the roaming device, thus enabling illumination to the sides of the device's path, so that coverage of at least 180° can be provided in the direction of travel of the roaming device.

The output signals containing the video images generated by the FUR or the visible light camera may be returned to the control module by means of a fiber optical link, this providing an interference-free link with high bandwidth and of very low weight. In prior art data links of ground-based robotic carts or tractors, the fiber is generally statically connected to the roaming cart or tractor and is pulled forward by the roaming device as it progresses, being paid out from a reel at the starting point of the motion path. Because of the motion of the optical fiber as the cart proceeds, the fiber may become stuck in any obstruction that it may encounter, and may be severed as the cart or tractor continues to move forward. In contrast to that prior art arrangement, the fiber of the presently described airborne roaming device, is pre-wound onto a freely rotating reel, generally carried at the rear section of the payload platform, and is spooled out by rotation of that reel as the payload platform proceeds down the passageway. By this means, the fiber optical link lies stationary on the floor of the passageway, and the danger of it catching on an obstruction is therefore eliminated. Furthermore, the distance which the device has traveled, can readily be measured by ascertaining how much of the optical fiber has been spooled out of the reel. This can be achieved very simply by measurement of the number of rotations that the reel makes as it pays out the optical fiber on it, such as by use of a simple optical encoder, or any other revolution-counting device. Such a conversion of rotation to distance has to take into account the changing outer diameter of the remaining depth of optical fiber wound onto the reel, though the small diameter of an optical fiber may make this compensation negligible.

In addition to the forward-looking camera system, which carries out the main surveillance objective of the roaming device, the payload platform may also carry the following additional sensors:

(i) A distance sensor, which continually measures the distance from the floating device to the roof or upper surface of the passageway, and provides information to the lift rotor or rotors to maintain, using a feedback loop, a safe and preferably fixed distance of the device from that roof or upper surface of the passageway. Since the hovering height of the device is thus automatically fixed relative to the height of the passage in which it is operating, horizontal navigation becomes simpler to execute and control.

(ii) A device for determining the spatial location of the roaming device. Since a GPS-based sensor will not be operable in many underground situations, a magnetometeric compass can be used for continuously measuring the direction of motion of the device, which, combined with the distance travelled determined by the fiber pay-out sensor previously described, provides the geographic position of the roaming device.

(iii) Accelerometers and angular rotation rate meters or a gyroscope can be provided in order to determine the motion of the roaming device in three dimensions. These sensors are preferably implemented as MEMS devices, thereby reducing their size and weight to chip level. For all of the position and motion sensing functions outlined here, use may be made of multiple axis motion tracking devices, such as are used on smartphones, motion sensors, and other consumer electronics devices.

All of the sensor outputs are processed in the device microprocessor, which receives and integrates all of the information about the position and orientation of the roaming device, and any control commands from the device operator, and can control both the direction of motion of the device, and the direction of the field of view of the camera in the nose of the payload platform.

The integrated position output and the camera outputs are conveyed down the payed-out optical fiber to the control module for display, where the device operator can review the overall data received relative to the position of the device. The video image output of the surveillance camera can be displayed on a monitor screen to the device operator, or can be sent to a remote computer for display.

There is thus provided in accordance with an exemplary implementation of the devices described in this disclosure, an airborne device for surveillance of an enclosed area, comprising:

(i) a platform having an illuminating device and an imaging device; and (ii) a lighter than air balloon attached to the platform, wherein the platform comprises:

(a) at least one motor driven rotor, having its axis vertically directed, such that it provides lift to the platform, (b) at least one motor driven rotor having its axis aligned along the longitudinal axis of the platform, such that it provides motion to the platform in the direction of the longitudinal axis, (c) at least one other motor driven rotor having its axis in a generally horizontal plane at an angle to the longitudinal axis of the platform, (d) a distance sensor directed such that it can measure the distance of the airborne device from the roof of the enclosed area, and (e) a reel on which there is wound a length of optical fiber, the optical fiber receiving image data from the imaging device, and transmitting it to a remote monitor, and wherein the reel is free to rotate such that as the platform moves in a forward direction, the reel rotates to enable the optical fiber to deploy in a backward direction from the reel.

In such a device, the platform may further comprise a second sensor for determining the length of optical fiber deployed from the reel, such that the distance travelled by the airborne device can be determined. This second sensor may be adapted to measure the number of rotations of the reel, and if so, may comprise an optical encoder or a slotted optical switch. In any such device, the platform may further comprise additional sensors for determining the changes in orientation of the airborne device, such that, by combining information on the changes in orientation of the airborne device with the determined distance travelled by the airborne device, the absolute position of the airborne device can be determined. These additional sensors may comprise at least one of a gyroscope, an accelerometer, and a digital compass.

Furthermore, in any of the above-described devices, the lighter than air balloon may be of such a size and fill that can supply the majority of the lift of the airborne device. In such a case, the lighter than air balloon may be of such a size and fill that it supplies more than 90% of the lift of the airborne device.

Another example implementation can involve an airborne device of the type described hereinabove, in which the imaging device is a visible light camera or a FLIR camera. Furthermore, the alignment of the imaging device may be adjustable by means of a controlled pivoting device to enable imaging differently directed fields of view.

Yet other implementations may involve a method of determining the distance travelled by an airborne device, comprising:

(i) providing a reel of optical fiber at the rear end of the device, the reel being freely rotatable, (ii) attaching a remote end of the optical fiber to a fixed point, (iii) allowing the optical fiber to unravel from the reel as the airborne device moves away from the fixed point, and (iv) measuring the number of rotations the reel performs during the motion, wherein the distance travelled by the airborne device is calculable from the number of rotations performed by the reel.

In such a method, the measuring of the number of rotations the reel performs during the motion, may be determined by use of an optical encoder operating on the reel.

BRIEF DESCRIPTION OF THE DRAWINGS

The present invention will be understood and appreciated more fully from the following detailed description, taken in conjunction with the drawings in which.

DETAILED DESCRIPTION

Figure 1:
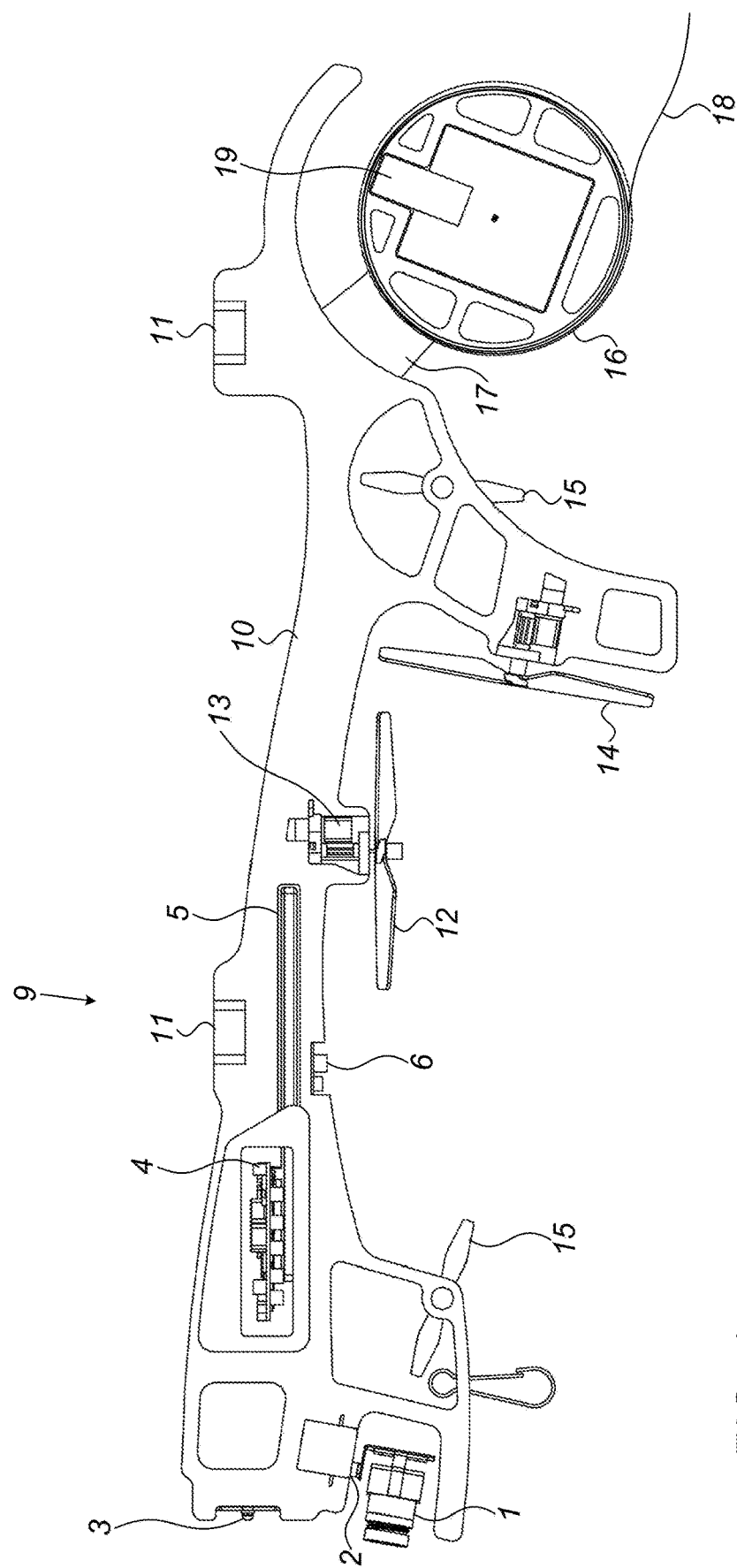
FIG. 1 illustrates schematically a side elevation view of the payload platform of a roaming device according to an exemplary implementation of the systems of the present disclosure.

Reference is now made to FIG. 1, which illustrates schematically a side elevation view of the payload platform 9 of a roaming device according to an exemplary implementation of the systems of the present disclosure. The design of the roaming device shown in FIG. 1 is understood to be only one example of the manner in which the systems of this disclosure can be constructed, and is not intended to be limiting. Alternative geometric and mechanical arrangements can also be construed within the framework of this disclosure, so long as the intended operational functions of the roaming device are achieved.

The frame 10 of the payload platform 9 should be constructed of a lightweight material, such as a lightweight polymer or fiber construction, since the lighter the payload, the smaller is the size of the balloon required to support that payload. And, the smaller the size of the balloon, the smaller the dimensions of the passageways through which the roaming device can travel or roam. At the top edge of the frame, connectors 11 are provided in order to attach the frame 10 to its lighter-than-air balloon, as will be shown in FIG. 3 hereinbelow. Additional buoyancy, and control of the hovering height of the payload platform, is provided by a main buoyancy rotor 12, which is mounted with its rotor blades generally horizontal such that it can supply lift to the payload. This rotor is operated by an electric motor 13, as is the case with all the other rotors on the payload platform. The main forward motion rotor 14, is mounted with its axis in an almost horizontal orientation, and along the longitudinal axis of the payload platform, and is installed slightly aft the center of gravity of the platform. The slight upwards tilt given to this rotor is intended to compensate for reduction in lift by the lift rotor when the other rotors are operating and drain current from the main battery. The slight upward tilt of the main traction rotor provides an additional element of lift under those conditions. A pair of laterally directed rotors 15 are provided near the front and rear ends of the payload platform in order to provide the platform with yaw motion, which is used to enable the roaming device to rotate about itself to negotiate corners of the passage or space in which it is traveling. At the rear end of the frame, there is installed a freely rotating reel or spool 16, supported on a strut structure 17. The optical fiber 18 is wound on this reel 16, and as the roaming device moves forward through the passageway being surveilled or charted, the reel rotates freely as the optical fiber 18 is deployed out behind the moving device. A revolution-counting device, such as an optical encoder device and optical slotted switch assembly 19, or any other suitable device may be used to count the number of revolutions of the reel, which can be translated into the length of fiber unwound, so that the distance traveled by the device can be determined.

The surveillance payload is mounted in the forward part of the frame, with the imaging camera 1 mounted at the front, on a controlled rotatable gimbal or pivot 2, so that the direction of the field of view of the camera can be adjusted according to the requirements of the operator. A LED illumination device 3 is also shown mounted on the front end of the frame. The electronic circuit board or boards 4 are used both for processing the camera video output and for control of all of the motion and stability functions of the payload platform through the various rotors and sensors of the platform. These electronic circuits can also be used for hovering height control and for position and distance sensing, using inputs from the various sensors installed on the platform. In addition, the electronic circuit board may be used to convert the electronic video signal from the camera to and optical signal for transmission down the optical fiber 18. The height sensor 5, may conveniently be an optical height sensor, transmitting a modulated optical beam upwards, and determining the transit time for the pulses to return to the detector after reflection off the roof or ceiling. Finally, a lightweight battery 6 is installed for powering the electronic circuitry and the electric motors for the various rotors installed on the platform.

Figure 2:
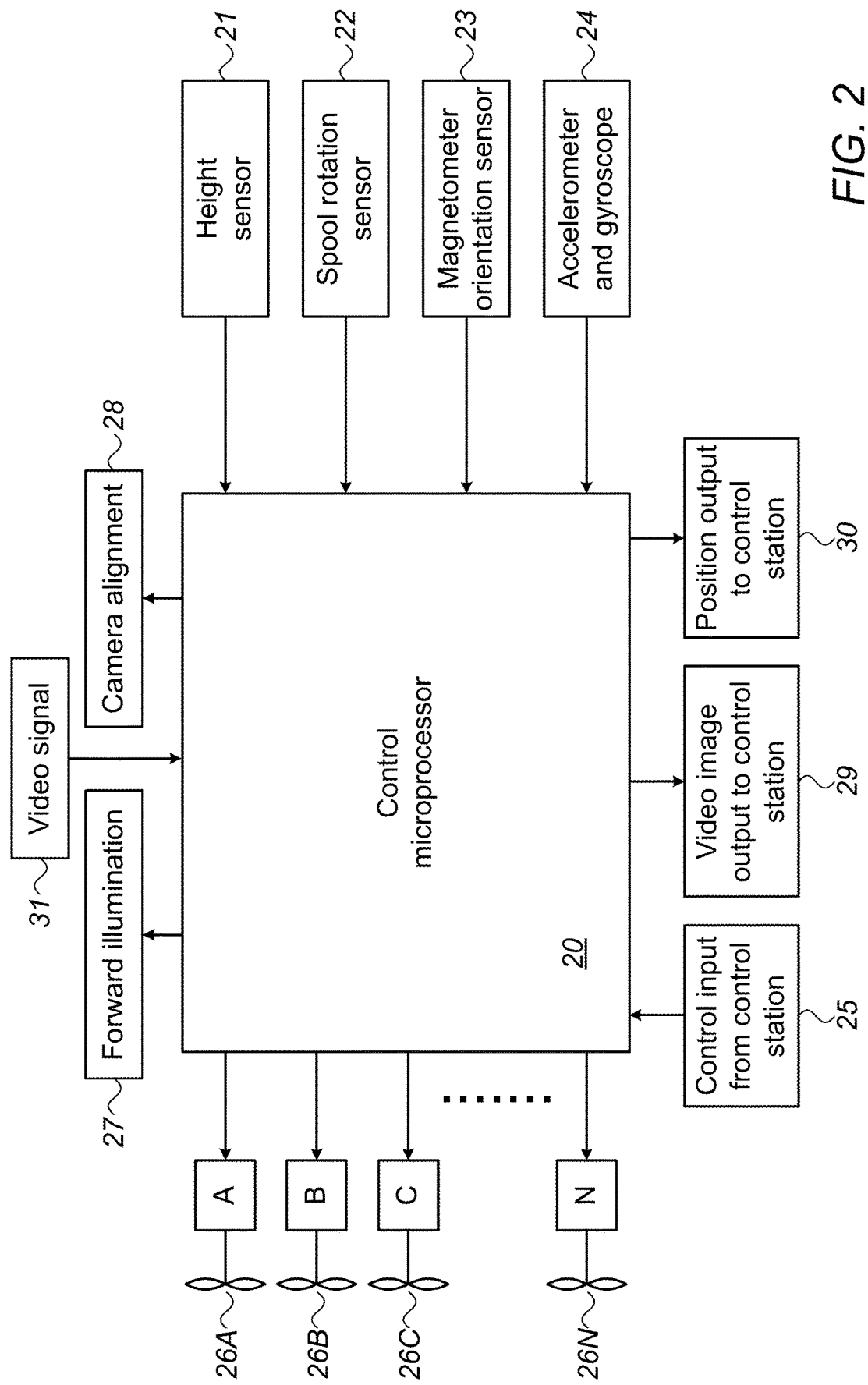
FIG. 2 is a schematic block diagram of one exemplary implementation of an electronics and control system suitable for the roaming device whose platform is shown in FIG. 1.

Reference is now made to FIG. 2, which illustrates a schematic block diagram of one exemplary implementation of an electronics and control system suitable for the roaming device shown in FIG. 1. The control of the device is performed in a central control microprocessor 20, advantageously implemented on a field-programmable gate array (FPGA), device mounted on the electronic circuit board 4 on the payload platform 9. The controller receives the inputs from the various sensors to define the position of the device. These inputs include the input from the height sensor 21, the input from the spool rotation sensor 22, which is used to determine the linear distance traveled, the input from the magnetometer orientation sensor or the magnetic compass 23 and the input from the MEMS accelerometer and gyroscope devices 24. The latter two sensors 23, 24, can be integrated into a single chip motion-tracking device. One such device, the MPU-9250 available from InvenSense Inc. of San Jose, Calif., USA, has 9-axis performance, and is currently available in a single lightweight package measuring no more than 3 mm×3 mm×1 mm, and including a 3-axis gyroscope, a 3-axis accelerometer, a 3-axis digital compass and an onboard microprocessor for processing the data from all of these functions to provide the orientation of the platform in all 3 dimensions.

The integrated output information regarding the device's path and position is output through the optical fiber to the monitor station 30, where the device operator can view the progress of the device. Based on this progress, and on any preplanned surveilling program, the device operator can input control commands 25 to the device, to instruct it to perform the required motion steps, and to instruct the forward illumination 27 to operate and to control the camera alignment 28. The video signals received by the imaging camera are input 31 to the controller, and are output to the monitor station 29 through the optical fiber, after conversion from digital and analog electronic signals to optical signals.

Finally, based on the distance, height and orientation inputs, and on the planned or instructed position, height and orientation of the device, electrical outputs are supplied to the motors of the various rotors, 26A, 26B, 26C, . . . 26N in order to achieve the desired results.

It is to be emphasized that the scheme outlined in FIG. 2 is only one possible arrangement for control of the roaming explorer device, and that it is possible to use alternative control schemes to achieve the objectives in the control of the device.

Figure 3:
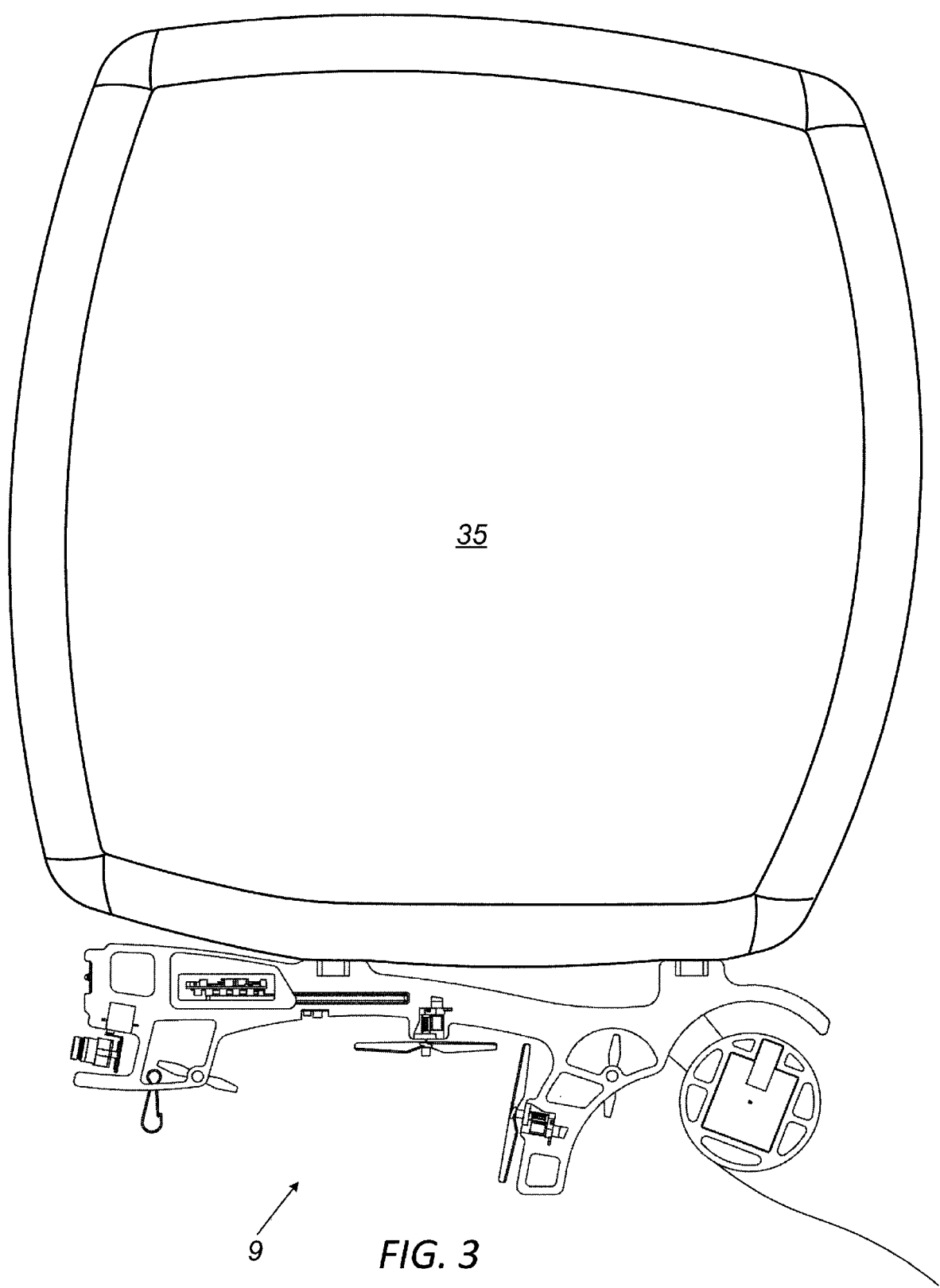
FIG. 3 illustrates schematically the payload platform of FIG. 1, attached to its buoyancy balloon.

Reference is now made to FIG. 3, which illustrates schematically a payload platform 9 of the type shown in FIG. 1, attached to its buoyancy balloon 35. In order to support 90% of the weight of a payload platform of the type shown in FIG. 1, and 45 cm in length, a balloon fill of helium of volume approximately 200 to 250 l is required. Such a balloon can support a weight of approximately 120 g. One exemplary design of the 45 cm payload platform of FIG. 1, weighs 130 gm. Therefore, using the above-described balloon, an additional lift of 10 gm must be supplied by the lift rotor or rotors of the platform. This example illustrates the advantage to be obtained by the use of a buoyancy balloon in the present described systems. Whereas a conventional quadcopter of that lifting ability may have a battery capacity to keep it airborne for 10 to 15 minutes, use of a buoyancy balloon 35 as in the present disclosure, increases the flight time to over 30 minutes.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. An airborne device for surveillance of a covered passageway, comprising:
   a platform having a longitudinal axis, and an illuminating device and an imaging device; and
   a lighter than air balloon attached to said platform,
   wherein said platform further comprises:
      at least a first motor driven rotor, having its axis vertically directed, such that lift to said platform is provided;
      at least a second motor driven rotor having its axis aligned along the longitudinal axis of said platform, such that motion to said platform in the direction of said longitudinal axis is provided;
      at least a third motor driven rotor having its axis in a generally horizontal plane at an angle to the longitudinal axis of said platform, such that lateral motion to said platform is provided;
      a distance sensor directed such that it can measure the distance of said airborne device from the roof of said covered passageway; and
      a reel on which there is wound a length of optical fiber, said optical fiber receiving image data from said imaging device, and transmitting it to a remote monitor,
   wherein said reel is free to rotate such that as said platform moves in a forward direction, said reel rotates to enable said optical fiber to deploy in a backward direction from said reel.

2. An airborne device according to claim 1, wherein said platform further comprises a second sensor for determining the length of optical fiber deployed from said reel, such that the distance travelled by said airborne device can be determined.

3. An airborne device according to claim 2, wherein said second sensor is adapted to measure the number of rotations of said reel.

4. An airborne device according to claim 3, wherein said second sensor comprises an optical encoder or a slotted optical switch.

5. An airborne device according to claim 4, said platform further comprising additional sensors for determining the changes in orientation of said airborne device, such that, by combining information on said changes in orientation of said airborne device with the determined distance travelled by said airborne device, the absolute position of said airborne device can be determined.

6. An airborne device according to claim 3, said platform further comprising additional sensors for determining the changes in orientation of said airborne device, such that, by combining information on said changes in orientation of said airborne device with the determined distance travelled by said airborne device, the absolute position of said airborne device can be determined.

7. An airborne device according to claim 2, said platform further comprising additional sensors for determining the changes in orientation of said airborne device, such that, by combining information on said changes in orientation of said airborne device with the determined distance travelled by said airborne device, the absolute position of said airborne device can be determined.

8. An airborne device according to claim 7, wherein said additional sensors comprise at least one of a gyroscope, an accelerometer, and a digital compass.

9. An airborne device according to claim 2, wherein said lighter than air balloon is of such a size and fill that it supplies the majority of the lift of said airborne device.

10. An airborne device according to claim 1, wherein said lighter than air balloon is of such a size and fill that it supplies more than 90% of the lift of said airborne device.

11. An airborne device according to claim 1, wherein said imaging device is a visible light camera or a forward looking infrared (FLIR) camera.

12. An airborne device according to claim 1, wherein the alignment of said imaging device is adjustable by means of a controlled pivoting device to enable imaging differently directed fields of view.

* * * * *